Patented May 26, 1936

2,041,782

UNITED STATES PATENT OFFICE 2,041,782

PREPARATION OF SECONDARY AMINES

Waldo L. Semon, Silver Lake Village, Ohio, assignor to The B. F. Goodrich Company, New York, N. Y., a corporation of New York No Drawing. Application June 23, 1933, Serial No. 677,274

16 Claims. (Cl. 260—128)

This invention relates to the art of organic chemistry and particularly to the preparation of certain secondary aromatic amines.

The methods which have been employed heretofore for the preparation of secondary aromatic amines, particularly those which are not symmetrical around the amino group, have frequently involved the use of expensive reagents, not readily obtainable in large quantities, and the yields obtained have frequently been so low as to increase the cost of the products several fold. The chief object of this invention is accordingly to produce secondary aromatic amines from readily available materials, by a comparatively simple process, and at a moderate cost.

This invention, in brief, consists in preparing a mixture of primary aromatic amines by the reduction of a suitable azo compound, and then heating the mixture to induce a condensation reaction with the formation of a secondary amine. The necessity for separating and purifying the individual amines, which is frequently attended by considerable difficulty and expense, is consequently wholly avoided. The invention will best be understood by reference to certain specific examples, which, however, are to be regarded merely as illustrative of the invention and not as limiting its scope.

Example 1.—Para-hydroxy azo benzene is prepared in the usual way by diazotizing aniline and coupling with phenol. For example, 46.5 pounds of aniline are mixed with 133 pounds of concentrated hydrochloric acid and allowed to cool. From 300 to 375 pounds of ice are then added to reduce the temperature to 5° C., and 37 pounds of powdered sodium nitrite are then added slowly with rapid agitation. A solution of 47 pounds of phenol and 22 pounds of caustic soda in about 12 gallons of water is next slowly added and finally the solution is carefully neutralized with an alkali, care being taken not to render it alkaline. 30 pounds of salt are then dissolved in the mixture to reduce the solubility of the azo compound which may then be filtered off.

The hydroxy azo benzene may be reduced in any one of a number of ways, for instance, with iron and hydrochloric acid, with zinc and acid, with a sulphide, or catalytically with hydrogen itself. In one method the p-hydroxy azo benzene prepared as described above is mixed with about 40 gallons of water containing 4½ pounds of concentrated hydrochloric acid. The mixture is heated and 55 pounds of iron are slowly added. The reduced product contains a mixture of equimolecular proportions of aniline and p-aminophenol. The mixture is neutralized with caustic soda, and the iron oxide is filtered from the hot liquid. After cooling, the mixture of aniline and p-aminophenol is separated from the aqueous layer. If desired, the yield may be somewhat increased by washing the iron oxide sludge with a small quantity of hot water and employing this water, containing a certain quantity of dissolved amines, in the reduction of the next batch.

The condensation of the aniline with the p-aminophenol is preferably carried out in the presence of an excess of aniline, hence an additional quantity of aniline equivalent to from three to five times that already present in the mixture is added, together with a small quantity of a condensation catalyst such as hydrochloric acid, iodine, zinc chloride, etc. Thus, 200 pounds of aniline may be added to the mixture of aniline and p-aminophenol obtained as described above, together with 1 pound of concentrated hydrochloric acid, and the mixture heated to its boiling temperature in a suitable kettle equipped with a reflux condenser. The p-aminophenol reacts with the aniline to form p-hydroxy diphenylamine, ammonia being eliminated. A certain quantity of diphenyl p-phenylene diamine is also formed by the further reaction of the hydroxy diphenylamine with the excess aniline, with the elimination of water. The proportions of these two products can be regulated by varying the time of heating, and to some extent by varying the quantity of excess aniline used. Thus, if p-hydroxy diphenylamine is the desired product, the heating is interrupted before the condensation of the p-aminophenol with the aniline is completed, say after 4 or 5 hours. The mixture is then fractionally distilled, preferably in a vacuum, the light fractions, containing the excess aniline and any unreacted p-aminophenol, being returned to the next batch, and the p-hydroxy diphenylamine being separated from the less volatile diphenyl p-phenylene diamine. If the latter compound is the desired product, the heating is continued for a longer time, say 24 hours, and the hydroxy diphenylamine obtained in the fractional distillation is returned to the next batch along with the excess aniline.

In an alternative modification of this process, the p-hydroxy azo benzene, instead of being separated from the brine by filtration, is separated by extraction with aniline. The entire excess of aniline which is later required, 200 lbs. in the specific example given above, is added to the suspension of the p-hydroxy azo benzene after the addition of the salt. The p-hydroxy azo benzene dissolves in the aniline, forming a supernatent layer which is separated from the aqueous brine. The p-hydroxy azo benzene dissolved in the aniline may be reduced by the use of iron exactly as described above, or in any other suitable way. The catalytic reduction with hydrogen is particularly advantageous in this modification, for the excess aniline used as a solvent renders the mixture liquid and easy to handle in the ordinary hydrogenation apparatus, and because the loss of some of the amines by solution in the aqueous media employed in other methods of reduction is avoided. The reduced mixture then contains the proper proportions of aniline and p-aminophenol and needs only the addition of hydrochloric acid or such other condensation catalyst as may be employed, before being heated as described above to initiate the condensation reaction.

*Example 2.*—Para-amino azo benzene is prepared in the usual way by diazotizing a large quantity of aniline with a small quantity of nitrous acid to produce diazo-aminobenzene, and converting the diazo-aminobenzene to p-amino azo benzene by warming it in the presence of acid. For example, 150 pounds of aniline are mixed with 20 pounds of concentrated hydrochloric acid, and ice is added until the temperature is reduced to 25° C. A solution of 10 pounds of sodium nitrite in 30 pounds of water is slowly added along with enough more ice to maintain the temperature at 25° C. After 2 hours the water layer is removed, and 16 pounds of aniline to which has been added 1 pound of concentrated hydrochloric acid is added. The mixture is warmed gradually to 40° C. over a period of several hours, and is maintained at this temperature over night.

The aniline solution of p-amino azo benzene obtained in the manner just described is then reduced, for example, by adding 4 pounds of water and slowly adding 27 pounds of iron while maintaining the temperature at 45° C. After 6 to 8 hours, when reduction is complete, the liquid is neutralized with alkali and the iron oxide sludge is filtered off. The reduction changes the p-amino azo benzene to a mixture of aniline and p-phenylene diamine, hence the filtered liquid at this stage consists of a solution of p-phenylene diamine in a large excess of aniline.

The condensation of the p-phenylene diamine with the aniline is effected by adding a condensation catalyst such as from ½ to 1 pound of concentrated hydrochloric acid, and heating, for example, in an autoclave to a temperature of 290° C. for 6 hours, the ammonia gas produced by the reaction being preferably blown off every half hour or hour through a condenser which recovers aniline vapors. The product is finally fractionally distilled, preferably in a vacuum, the initial distillate of aniline being recovered for reuse in the process, and the intermediate distillate consisting largely of unchanged p-phenylene diamine and of p-amino diphenylamine being returned to the autoclave with the next batch. The desired product, diphenyl p-phenylene diamine, distills at 250°–280° C. at a pressure of about 4 mm. of mercury.

If desired, p-amino diphenylamine may be prepared in the same way by heating for a shorter time or at a lower temperature, and separating the product by fractional distillation.

Other secondary amines can be made in a similar way by reducing substituted azo compounds to produce a mixture of aromatic amines and condensing the mixture to give rise to a secondary amine. The azo compound may even be symmetrically substituted, in which case the two molecules of amine produced by the reduction will be identical and the final secondary amine will likewise be symmetrically substituted, but in the process of this invention it will generally be found most advantageous to employ unsymmetrical azo compounds which give rise to different amines and consequently to products which are unsymmetrical secondary amines. In some cases, as in the specific examples above, the yield of the desired product may be improved by employing an excess of one of the amines.

In general any aromatic primary amine such as aniline, toluidine, xylidine, cumidine, amino biphenyl, naphthylamine, phenylene, diamine, benzidine, diamino diphenylmethane, anisidine, phenetidine, etc., may be diazotized and coupled with any phenol or aromatic amine containing a replaceable hydrogen in the ortho or preferably the para position, including phenol, cresol, xylenol, thymol, carvacrol, guaiacol, phenyl phenol, naphthol, etc. or aniline, toluidine, xylidine, cumidine, amino biphenyl, naphthylamine, methyl aniline, ethyl aniline, dimethyl aniline, benzyl aniline, diphenylamine, anisidine, phenetidine, etc., and then reduced; or a diazo compound may be prepared and then modified in some way before being reduced. For instance, aniline may be diazotized and coupled with phenol to give p-hydroxy azo benzene, which is then methylated to p-methoxy azo benzene, reduced to a mixture of aniline and p-anisidine, and finally condensed to give p-methoxy diphenylamine. Other modifications will be obvious to any organic chemist.

While I have herein disclosed certain preferred manners of performing my invention, I do not thereby desire or intend to limit myself solely thereto, for, as hitherto stated, the precise proportions of the materials utilized may be varied and other materials having equivalent chemical properties may be employed if desired without departing from the spirit and scope of the invention as defined in the appended claims.

I claim:

1. The method which comprises reducing an azo compound to form a mixture of primary aromatic amines, and heating the mixture of amines to cause them to condense to a secondary aromatic amine.

2. The method which comprises reducing an unsymmetrically substituted azo compound to form a mixture of two different primary aromatic amines, and heating the mixture of amines to cause them to condense to a secondary aromatic amine.

3. The method which comprises reducing a hydroxy substituted azo compound to form a mixture of an aminophenol with another primary aromatic amino compound, and heating the mixture to cause its condensation to a secondary aromatic amine.

4. The method which comprises diazotizing a primary aromatic amine, coupling with a phenol, reducing the azo compound so produced to form a mixture of an aminophenol with another primary aromatic amine, and heating the mixture to cause its condensation to a secondary aromatic amine.

5. The method which comprises diazotizing a mono-aryl amine, coupling with phenol, reducing the azo compound so produced to form a mixture of p-aminophenol and the original mono-aryl amine, and heating the mixture to cause its condensation to a secondary aromatic amine.

6. The method which comprises diazotizing aniline, coupling with phenol, reducing the p-hydroxy azo benzene so produced to form a mixture of p-aminophenol and aniline, and heating the mixture to cause its condensation to a secondary aromatic amine.

7. The method which comprises reducing an unsymmetrically substituted azo compound to form a mixture of two different primary aromatic amines, adding in excess of one of the amines to the mixture, and heating the mixture to cause its condensation to a secondary aromatic amine.

8. The method which comprises reducing a hydroxy substituted azo compound to form a mixture of an aminophenol and another primary aromatic amine, adding an excess of the latter amine to the mixture, and heating the mixture to cause its condensation to a secondary aromatic amine.

9. The method which comprises reducing p-hydroxy azo benzene to form a mixture of p-aminophenol and aniline, adding an excess of aniline to the mixture, and heating the mixture to cause its condensation to a secondary aromatic amine.

10. The method which comprises reducing p-hydroxy azo benzene to form a mixture of p-aminophenol and aniline, adding an excess of aniline to the mixture, and heating the mixture for a limited time to cause its condensation to p-hydroxy diphenylamine.

11. The method which comprises reducing p-hydroxy azo benzene to form a mixture of p-aminophenol and aniline, adding an excess of aniline to the mixture, and heating the mixture until the major part of the p-aminophenol has condensed with the aniline to give diphenyl p-phenylene diamine.

12. The method which comprises diazotizing aniline, coupling with phenol, extracting the p-hydroxy azo benzene with aniline, reducing the solution of the p-hydroxy azo benzene in aniline to form a mixture of p-aminophenol with an excess of aniline, and heating the mixture for a limited time to cause its condensation to p-hydroxy diphenylamine.

13. The method which comprises diazotizing aniline, coupling with phenol, extracting the p-hydroxy azo benzene with aniline, reducing the solution of the p-hydroxy azo benzene in aniline to form a mixture of p-aminophenol with an excess of aniline, and heating the mixture until the major part of the p-aminophenol has condensed with the aniline to give diphenyl p-phenylene diamine.

14. The method which comprises diazotizing a primary aromatic amine, coupling with an aromatic amine, reducing the azo compound so produced to form a mixture of primary aromatic amines, and heating the mixture to cause its condensation to a secondary aromatic amine.

15. The method which comprises reducing an amino substituted azo compound to form a mixture of an aromatic diamine containing at least one primary amino group with another primary aromatic amine, and heating the mixture to cause its condensation to a secondary aromatic amine.

16. The method which comprises diazotizing aniline in the presence of an excess of aniline and acidifying to form a solution of p-amino azo benzene in aniline, reducing the solution to form a mixture of p-phenylene diamine with an excess of aniline, and heating the mixture to cause its condensation to diphenyl p-phenylene diamine.

WALDO L. SEMON.